United States Patent
Owechko et al.

(10) Patent No.: US 11,921,194 B2
(45) Date of Patent: Mar. 5, 2024

(54) RADAR ANTI-SPOOFING SYSTEMS FOR AN AUTONOMOUS VEHICLE THAT IDENTIFY GHOST VEHICLES

(71) Applicant: GM Global Technology Operations LLC, Detroit, MI (US)

(72) Inventors: Yuri Owechko, Newbury Park, CA (US); Qin Jiang, Woodland Hills, CA (US); Hyukseong Kwon, Thousand Oaks, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 289 days.

(21) Appl. No.: 17/551,666

(22) Filed: Dec. 15, 2021

(65) Prior Publication Data

US 2023/0184928 A1 Jun. 15, 2023

(51) Int. Cl.
*G01S 13/90* (2006.01)
*G01S 13/50* (2006.01)
*G06V 10/44* (2022.01)
*G06V 10/62* (2022.01)
*G06V 10/74* (2022.01)

(52) U.S. Cl.
CPC ........ *G01S 13/9029* (2013.01); *G01S 13/505* (2013.01); *G01S 13/9011* (2013.01); *G01S 13/9027* (2019.05); *G06V 10/443* (2022.01); *G06V 10/62* (2022.01); *G06V 10/761* (2022.01)

(58) Field of Classification Search
CPC ............. G01S 13/9029; G01S 13/9027; G01S 13/505; G01S 13/9011; G06V 10/443; G06V 10/761; G06V 10/62
See application file for complete search history.

(56) References Cited

U.S. PATENT DOCUMENTS

2021/0325508 A1* 10/2021 Wang .................. G01S 7/414
2022/0107184 A1* 4/2022 Omr .................. G01C 21/1656

FOREIGN PATENT DOCUMENTS

WO WO-2022104096 A1 * 5/2022

OTHER PUBLICATIONS

Djuric, P. M., et al. "Particle Filtering", IEEE Signal Processing Magazine, Sep. 2003, pp. 19-38, vol. 20, No. 5.
(Continued)

*Primary Examiner* — Peter M Bythrow
*Assistant Examiner* — Nazra Nur Waheed
(74) *Attorney, Agent, or Firm* — Vivacqua Crane, PLLC

(57) ABSTRACT

A radar anti-spoofing system for an autonomous vehicle includes a plurality of radar sensors that generate a plurality of input detection points representing radio frequency (RF) signals reflected from objects and a controller in electronic communication with the plurality of radar sensors. The one or more controllers execute instructions to determine a signal to noise ratio (SNR) distance ratio for the input detection points generated by the plurality of radar sensors, where a value of the SNR distance ratio is indicative of an object being a ghost vehicle. The one or more controllers also determine an effective particle number indicating a degree of particle degradation for the importance sampling for each variable that is part of the state variable. In response to determining the effective particle number is equal to or less than a predetermined threshold, the one or more controllers estimate a ghost position for the ghost vehicle.

20 Claims, 5 Drawing Sheets

(56) References Cited

OTHER PUBLICATIONS

Arulampalam, M. S., et al. "A tutorial on particle filters for online nonlinear/non-Gaussian Bayesian tracking", IEEE Transactions on Signal Processing, Feb. 2002, pp. 174-188, vol. 50, No. 2.

Kerns A. J., et al. "Unmanned aircraft capture and control via GPS spoofing," Journal of Field Robotics, Apr. 2014, pp. 617-636, vol. 31, issue 4.

Kwon, C., et al. "Security analysis for cyber-physical systems against stealthy deception attacks", In American Control Conference (ACC), Jun. 2013, pp. 3344-3349.

Javaid, A. Y., et al. "Cyber security threat analysis and modeling of an unmanned aerial vehicle system", In Homeland Security (HST), Nov. 2012, pp. 585-590.

Davidson, D., et al. "Controlling UAVs with Sensor Input Spoofing Attacks", WOOT'16: Proceedings of the 10th USENIX Conference on Offensive Technologies, Aug. 2016, pp. 221-231.

Zhang Z., et al. "Strategies to Design Signals to Spoof Kalman Filter", 2018 Annual American Control Conference (ACC), Jun. 2018, pp. 5837-5842.

Bezzo, N., et al. "Attack resilient state estimation for autonomous robotic systems," IEEE/RSJ International Conference on Intelligent Robots and Systems, Sep. 2014, pp. 3692-3698.

\* cited by examiner

RADAR ANTI-SPOOFING SYSTEMS FOR AN AUTONOMOUS VEHICLE THAT IDENTIFY GHOST VEHICLES

INTRODUCTION

The present disclosure relates to systems and method for identifying ghost vehicles that are created when radar sensors of an autonomous vehicle are spoofed.

Autonomous vehicles may use a variety of sensors for environment sensing such as, for example, radar sensors, vision sensors, and LiDAR sensors. Any type of autonomous sensor may be spoofed, however, radar sensors tend to be spoofed most easily when compared to other autonomous sensors. Although radar sensors are easily spoofed, they are also the only autonomous sensor that works in many types of weather, and therefore it is advantageous to develop anti-spoofing techniques for radar sensors.

One relatively simple way to spoof radar sensors is to employ digital radio frequency (RF) memory to generate ghost vehicles. Ghost vehicles may confuse or misguide an autonomous vehicle. In particular, a digital memory device may be used to generate a false return RF signal by receiving, delaying, and repeating an RF signal transmitted by an autonomous vehicle. The false RF signal is treated and processed by a radar system of the autonomous vehicle as an actual return coming from another vehicle in the surrounding environment, thereby generating a ghost vehicle.

Thus, while current anti-spoofing techniques achieve their intended purpose, there is a need in the art for new and improved approaches that identify ghost vehicles.

SUMMARY

According to several aspects, a radar anti-spoofing system for an autonomous vehicle is disclosed. The radar anti-spoofing system includes a plurality of radar sensors that generate a plurality of input detection points representing radio frequency (RF) signals reflected from objects and one or more controllers in electronic communication with the plurality of radar sensors, where the one or more controllers execute instructions to determine a signal to noise ratio (SNR) distance ratio for the plurality of input detection points generated by the plurality of radar sensors, where a value of the SNR distance ratio is indicative of an object being a ghost vehicle. The one or more controllers execute instructions to determine importance sampling for each variable that is part of a state variable based on the plurality of input detection points and the SNR distance ratio. The one or more controllers execute instructions to weight the importance sampling for each variable that is part of the state variable. The one or more controllers execute instructions to determine an effective particle number indicating a degree of particle degradation for the importance sampling for each variable that is part of the state variable. Finally, in response to determining the effective particle number is equal to or less than a predetermined threshold, the one or more controllers estimate a ghost position for the ghost vehicle based on the state variable.

In an aspect, the SNR distance ratio represents a difference in an SNR constraint variable for the object over time, where the SNR constraint variable represents a physical constraint between a measured SNR and a distance of the object.

In another aspect, the SNR distance ratio is determined by:

$$\gamma = \frac{C(t+1)}{C(t)} = \left[\frac{d_M(t+1)d_T(t)}{d_M(t)d_T(t+1)}\right]^4$$

where t and t+1 represent sequential time steps, $\gamma$ is an SNR constraint variable, $d_T$ represents a true distance, and $d_M$ represents a measured distance.

In yet another aspect, the state variable is expressed as:

$$X_t = [x(t), y(t), v_x(t), v_y(t), \gamma(t)]^T$$

where $X_t$ is the state variable, $x(t)$, $y(t)$ represent x and y positions, $v_x(t)$, $v_y(t)$ represent x and y velocity coordinates, and $\gamma(t)$ is the SNR distance ratio.

In an aspect, weighting the importance sampling for each variable that is part of the state variable is done by determining:

$$w_t^i = w_{t-1}^i * p(Z_t | X_t^i, Z_{t-1})$$

$$p(Z_t | X_t^i, Z_{t-1}) \propto \Pi_{j=1}^5 (1 + e^{-|X_t^i(j) - Z_{t-1}(j)|/2\sigma_j})$$

where $w_t^i$ represents weights of sampled points at time step t, $p(Z_t | X_t^i, Z_{t-1})$ is a posterior distribution, $\{X_t^i\}_{i=1}^N$ is a set of sampled points, and $\sigma_j$ represents a variance that depends upon a dynamic range of a corresponding component.

In another aspect, the effective particle number is determined by:

$$N_{eff} = \frac{1}{\sum_{i=1}^{N_s} (w_t^i)^2}$$

where $N_{eff}$ is the effective particle number, $N_s$ is a number of total particle points, and $w_t^i$ represents the weights of the sampled points at time step t.

In yet another aspect, the predetermined threshold is equal to half the number of total particle points.

In an aspect, the one or more controllers executes instructions to in response to determining the effective particle number is equal to or less than the predetermined threshold, re-execute a resampling operation to improve particle distribution.

In another aspect, the one or more controllers executes instructions to estimate the SNR distance ratio based on the state variable to determine an estimated SNR distance ratio.

In yet another aspect, the one or more controllers executes instructions to compare the estimated SNR distance ratio with a predetermined value less than one, and in response to determining the estimated SNR distance ratio is less than or equal to the predetermined value that is less than one, determine the ghost position is a valid ghost point.

In an aspect, the one or more controllers executes instructions to in response to determining estimated SNR distance ratio is greater than the predetermined value that is less than one, determine the ghost position is a non-ghost point.

In an aspect, a method for detecting and tracking ghost vehicles by a radar anti-spoofing system is disclosed. The method includes determining, by one or more controllers, a SNR distance ratio for input detection points generated by a plurality of radar sensors, where a value of the SNR distance ratio is indicative of an object being a ghost vehicle. The method further includes determining, by the one or more controllers, importance sampling for each variable that is part of a state variable based on the plurality of input detection points and the SNR distance ratio. The method also includes weighting the importance sampling for each variable that is part of the state variable. The method includes determining an effective particle number indicating a degree of particle degradation for the importance sampling for each variable that is part of the state variable. In response to determining the effective particle number is equal to or less than a predetermined threshold, the method includes estimating a ghost position for the ghost vehicle based on the state variable.

In another aspect, in response to determining the effective particle number is equal to or less than the predetermined threshold, the method includes re-executing a resampling operation to improve particle distribution.

In yet another aspect, the method includes estimating the SNR distance ratio based on the state variable to determine an estimated SNR distance ratio.

In an aspect, the method includes comparing the estimated SNR distance ratio with a predetermined value less than one, and in response to determining the estimated SNR distance ratio is less than or equal to the predetermined value that is less than one, determining the ghost position is a valid ghost point.

In another aspect, in response to determining estimated SNR distance ratio is greater than the predetermined value that is less than one, the method includes determining the ghost position is a non-ghost point.

In an aspect, a radar anti-spoofing system for an autonomous vehicle is disclosed. The radar anti-spoofing system includes a plurality of radar sensors that generate a plurality of input detection points representing RF signals reflected from objects and one or more controllers in electronic communication with the plurality of radar sensors, where the one or more controllers execute instructions to determine an SNR deviation factor for an object based on the plurality of input detection points from the plurality of radar sensors. The one or more controllers executes instructions to modify an innovation covariance matrix of a Kalman filter by combining a measurement noise covariance matrix with an SNR deviation factor. The one or more controllers executes instructions to determine a spoofing detection measure that quantifies a relationship between an updated state covariance matrix determined by the Kalman filter and a detected distance measured between the autonomous vehicle and the object, where a value of the spoofing detection measure changes with respect to time when the object is a ghost vehicle.

In another aspect, the one or more controllers execute instructions to determine a spoofing detection measurement ratio based on a standard deviation of the spoofing detection measure determined over a defined time window divided by a mean value of the spoofing detection measure determined over the defined time window.

In another aspect, the one or more controllers execute instructions to compare the spoofing detection measure ratio with a threshold value, and in response to determining the spoofing detection measure ratio is greater than the threshold value, determine the object is a ghost vehicle. In response to determining the spoofing detection measure ratio is less than or equal to the threshold value, the one or more controllers determine the object is a real vehicle.

In yet another aspect, the one or more controllers execute instructions to calculate a Doppler deviation factor for the object by determining a difference between an expected Doppler frequency and a measured Doppler frequency for the object.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
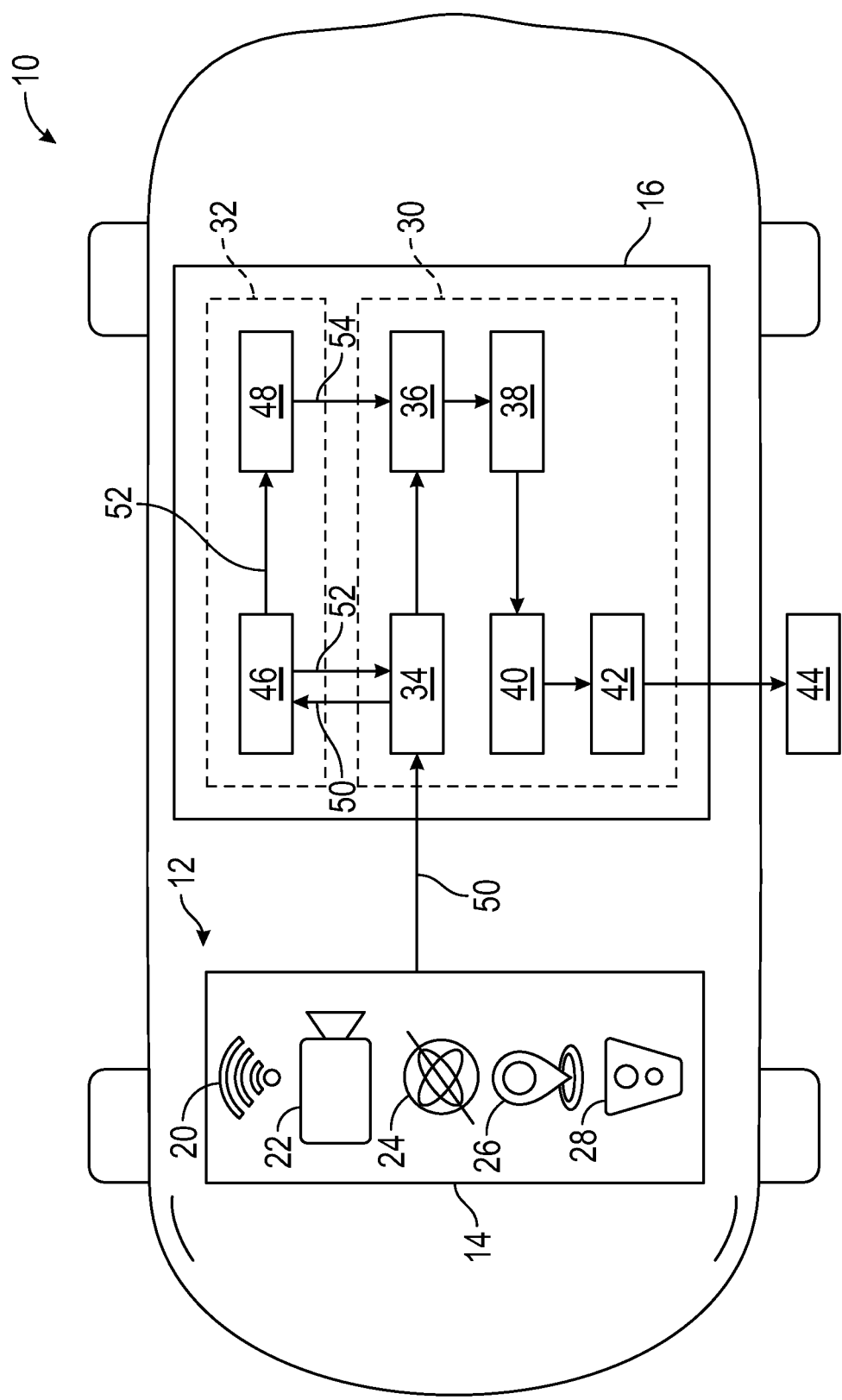
FIG. 1 is a schematic diagram of an exemplary autonomous vehicle including an autonomous driving system and the disclosed radar anti-spoofing system for identifying and tracking ghost vehicles, according to an exemplary embodiment.

Referring to FIG. 1, an exemplary autonomous vehicle 10 is illustrated. The autonomous vehicle 10 has an autonomous driving system 12 that includes a plurality of autonomous sensors 14 in electronic communication with one or more autonomous controllers 16. In the example as shown in FIG. 1, the plurality of autonomous sensors 14 include a plurality of radar sensors 20, one or more cameras 22, an inertial measurement unit (IMU) 24, a global positioning system (GPS) 26, and LiDAR 28, however, it is to be appreciated that additional sensors may be used as well. The one or more autonomous controllers 16 include an autonomous driving system 30 and a radar anti-spoofing system 32. The autonomous driving system 30 includes a vehicle detection block 34, a vehicle tracking block 36, a sensor fusion block 38, and a vehicle control block 40 that determines one or more action instructions 44 to guide the autonomous vehicle 10 based on input from the autonomous sensors 14. The radar anti-spoofing system 32 includes a ghost vehicle detection block 46 and a ghost vehicle tracking block 48.

As seen in FIG. 1, the radar anti-spoofing system 32 may be implemented as a stand-alone module, where no modifications are required by the autonomous driving system 30. The plurality of radar sensors 20 generate a plurality of demodulated radio frequency (RF) signals that represent RF signals reflected from objects located in the environment surrounding the autonomous vehicle 10, and are represented as a plurality of input detection points 50 received as input by the vehicle detection block 34 of the radar anti-spoofing system 32. The ghost vehicle detection block 46 of the radar anti-spoofing system 32 determines a signal to noise (SNR) distance ratio 52 and ghost vehicle detection points for identifying ghost vehicles, and the ghost vehicle tracking block 48 determines a ghost position 54 by tracking movement of the ghost vehicle based on a particle filter. The ghost vehicle tracking block 48 sends the ghost position 54 to the vehicle tracking block 36 of the autonomous driving system 30. Accordingly, the autonomous driving system 30 may prevent or mitigate the effects of radar sensor spoofing.

Figure 2:
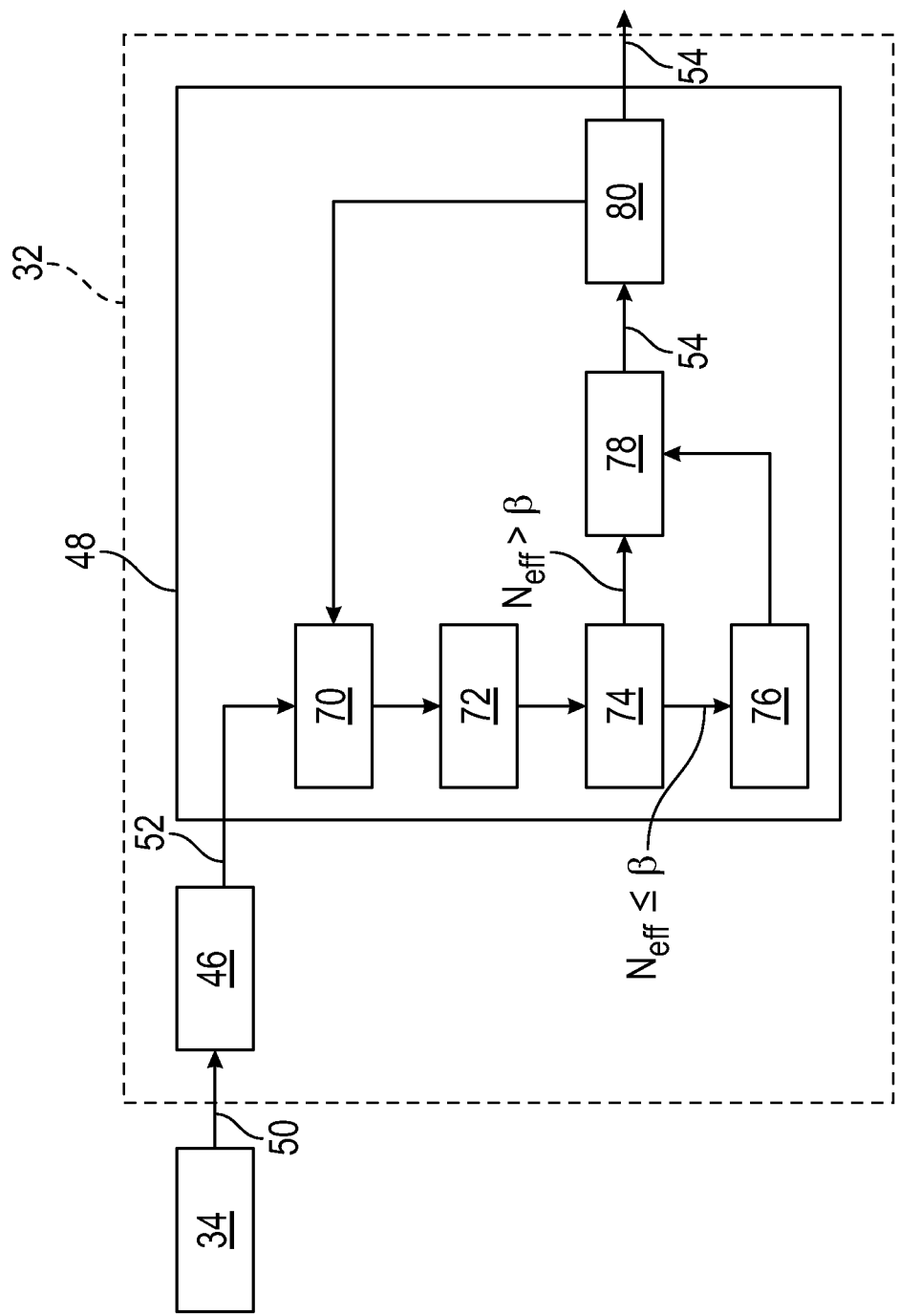
FIG. 2 is a block diagram of the disclosed radar anti-spoofing system shown in FIG. 1, according to an exemplary embodiment.

FIG. 2 is a block diagram of the radar anti-spoofing system 32. The ghost vehicle detection block 46 determines the SNR distance ratio 52 for an object in the environment based on the input detection points 50. The ghost vehicle detection block 46 determines the object is a ghost vehicle based on a value of the SNR distance ratio 52. The SNR distance ratio 52 represents a difference in an SNR constraint variable c for an object over time, where the SNR constraint variable c represents a physical constraint between a measured SNR and a distance of the object. Specifically, the measured SNR of an object is inversely proportional to a fourth power of the distance of the object. The SNR constraint variable c is determined by Equation 1 as:

$$c = SNR * d_M^4 = A\left(\frac{d_M}{d_T}\right)^4 = A * \left(1 - \frac{\Delta d}{d_T}\right)^4 \qquad \text{Equation 1}$$

where A is a constant derived from the parameters of specific radar sensor and is independent of distance, $d_T$ represents a true distance, $d_M$ represents a measured distance, and $\Delta d$ is a difference between the true distance and the measured distance. For a real moving vehicle, $\Delta d \ll d_T$, and $c \approx A$. However, for a ghost vehicle, the measured distance $d_M$ is determined by the time delay generated by the spoofer, but the true distance $d_T$ is the distance between the spoofer to the autonomous vehicle 10 (FIG. 1). If the ghost vehicle is between the spoofing vehicle and the autonomous vehicle 10, the measured distance is always less than the true distance ($\Delta d > 0$); and c<A. As the ghost vehicle approaches the autonomous vehicle 10, the SNR constraint variable c goes to zero.

The measured distance $d_M$ and the true distance $d_T$ of a real vehicle are relatively close in value, and differences between the measured distance $d_M$ and the true distance $d_T$ are due to measurement noise. Moreover, it is to be appreciated that the SNR constraint variable c of the real vehicle is close to a constant value. In contrast, the measured distance $d_M$ and the true distance $d_T$ of a ghost vehicle are mismatched and have a relatively large difference in value. The SNR constraint variable c of the ghost vehicle varies with time and goes to zero as the ghost vehicle approaches the autonomous vehicle 10 (FIG. 1). The SNR distance ratio 52 is determined by Equation 2, which is:

$$\gamma = \frac{C(t+1)}{C(t)} = \left[\frac{d_M(t+1)d_T(t)}{d_M(t)d_T(t+1)}\right]^4 \qquad \text{Equation 2}$$

where t and t+1 represent sequential time steps and γ is the SNR distance ratio 52. For a real vehicle, $d_M(t+1) \approx d_T(t+1)$ and $d_M(t) \approx d_T(t)$, and the SNR distance ratio 52 is approximately 1.0 (γ≈1.0). For a ghost vehicle, assuming the spoofing vehicle is at a constant distance to the autonomous vehicle 10 and the ghost vehicle is approaching the autonomous vehicle 10, the SNR distance ratio 52 is less than 1.0 and goes to 0 because the true distance $d_T$ is approximately the same between sequential time steps, however, the measured distance $d_M$ decreases as the time step increases, or $d_T(t+1) \approx d_T(t)$ and $d_M(t+1) \leq d_M(t)$. Thus, the value of the SNR distance ratio 52 indicates when the object is a ghost vehicle.

As seen in FIG. 1, the SNR distance ratio 52 is sent to the vehicle detection block 34 and the ghost vehicle tracking block 48. The ghost vehicle tracking block 48 determines the ghost position 54 of the object based on the SNR distance ratio 52, a position of the object, and a velocity of the object using a particle filtering. Specifically, it is to be appreciated that the temporal changes in the SNR distance ratio 52 are highly nonlinear. For moving object tracking, if the underlying system is linear in a Gaussian noise environment, then Kalman filtering may be used. However, since the SNR distance ratio 52 is nonlinear, particle filtering is used to track ghost vehicles.

FIG. 2 is a block diagram illustrating the ghost vehicle tracking block 48, where the ghost vehicle tracking block 48 includes a sampling block 70, a weighting block 72, a check degradation block 74, a resampling block 76, an estimation block 78, and a check constraint ratio block 80. Referring now to FIG. 2, the sampling block 70 of the ghost vehicle tracking block 48 determines importance sampling for each variable that is part of a state variable $X_t$ based on the input detection points 50, previous values, and the SNR distance ratio 52. The state variable $X_t$ is expressed in Equation 3 as:

$$X_t = [x(t), y(t), v_x(t), v_y(t), \gamma(t)]^T \qquad \text{Equation 3}$$

where x(t), y(t) represent x and y positions, $v_x(t)$, $v_y(t)$ represent x and y velocity coordinates, and γ(t) is the SNR distance ratio 52.

An observation variable $Z_t$ is expressed as $Z_t = X_t + u_t$, where $u_t$ is an independent random noise process. For a given observation variable $Z_t$, the importance sampling for each variable that is part of the state variable $X_t$ for the x-position x(t) is expressed in Equation set 4 as:

$$\begin{cases} x^i(t) \sim N(m_x, \sigma_x) \\ m_x = x^i(t-1) - Z_t(3) * dt \\ \sigma_x = a_x * |Z_t(t) - x^i(t-1)| \end{cases} \qquad \text{Equation Set 4}$$

where N(m, σ) represents a normal distribution sample with a mean of m and a variance of σ, and $a_x$ is a constant for controlling the variances of the importance sampling and includes a value that is greater than 0. The sampling block 70 calculates an importance sampling for each variable that is part of the state variable $X_t$ (i.e., x(t), y(t), $v_x(t)$, $v_y(t)$, γ(t)), and is expressed in Equation Sets 5-8 as:

$$\begin{cases} y^i(t) \sim N(m_y, \sigma_y) \\ m_y = y^i(t-1) - Z_t(4) * dt \\ \sigma_y = a_y * |Z_t(t) - y^i(t-1)| \end{cases} \qquad \text{Equation Set 5}$$

$$\begin{cases} v_x^i(t) \sim N(m_{vx}, \sigma_{vx}) \\ m_{vx} = v_x^i(t-1) \\ \sigma_{vx} = a_{vx} * |Z_t(3) - v_x^i(t-1)| \end{cases} \qquad \text{Equation Set 6}$$

$$\begin{cases} v_y^i(t) \sim N(m_{vy}, \sigma_{vy}) \\ m_{vy} = v_y^i(t-1) \\ \sigma_{vy} = a_{vy} * |Z_t(4) - v_y^i(t-1)| \end{cases} \qquad \text{Equation Set 7}$$

$$\begin{cases} \gamma^i(t) \sim N(m_\gamma, \sigma_\gamma) \\ m_\gamma = \gamma^i(t-1) \\ \sigma_\gamma = a_\gamma * |Z_t(5) - \gamma(t-1)| \end{cases} \qquad \text{Equation Set 8}$$

where $a_y$, $a_{vx}$, $a_{vy}$, $a_\gamma$, are constants for controlling the variances of the importance sampling and they are larger than zero, t is a time step, and t−1 is a time step immediately before t.

The weighting block 72 determines weights of the importance sampling corresponding to each variable that is part the state variable $X_t$ based on Equations 9 and 10, which are:

$$w_t^i = w_{t-1}^i * p(Z_t | X_t^i, Z_{t-1}) \quad \text{Equation 9}$$

$$p(Z_t | X_t^i, Z_{t-1}) \propto \Pi_{j=1}^5 (1 + e^{-|X_t^i(j) - Z_{t-1}(j)|/2\sigma_j}) \quad \text{Equation 10}$$

where $w_t^i$ represents the weights of the sampled points at time step t, $p(Z_t | X_t^i, Z_{t-1})$ is a posterior distribution, $\{X_t^i\}_{i=1}^N$ is the set of sampled points, and $\sigma_j$ represents a variance that depends upon the dynamic range of a corresponding component. The weighting block 72 then normalizes the weights for each time step t based on Equation 11, which is:

$$w_t^j = \frac{w_t^j}{\sum_j w_t^j} \quad \text{Equation 11}$$

The check degradation block 74 determines an effective particle number $N_{eff}$ that indicates a degree of particle degradation for the importance sampling for each variable that is part of the state variable $X_t$. In an embodiment, the effective particle number $N_{eff}$ is determined based on Equation 12, which is:

$$N_{eff} = \frac{1}{\sum_{i=1}^{N_s} (w_t^i)^2} \quad \text{Equation 12}$$

where $N_s$ is the number of total particle points. The check degradation block 74 then compares the effective particle number $N_{eff}$ with a predetermined threshold $\beta$. In an embodiment, the predetermined threshold is equal to half the number of total particle points, or $N_s/2$, however, other values may be used as well. In response to determining the effective particle number $N_{eff}$ is equal to or less than the predetermined threshold $\beta$, the resampling block 76 re-executes a resampling operation to improve the particle distribution. The resampling operation spreads the concentrated weight values to multiple samples. However, in response to determining the effective particle number $N_{eff}$ is greater than the predetermined threshold $\beta$, then the resampling block 76 sends the sampled points and the state variable $X_t$ to the estimation block 78.

The estimation block 78 estimates the ghost position 54 for a ghost vehicle based on the state variable $X_t$ by Equation 13, which is:

$$pos(x,y) = E[X_t(1:2)] \quad \text{Equation 13}$$

where pos(x,y) represents an x, y coordinate of the ghost position 54 of the ghost vehicle. Once the ghost position 54 is determined, the check constraint ratio block 80 estimates the SNR distance ratio 52 based on the state variable $X_t$ by Equation 14, which indicates the state variable $X_t$ includes five elements and an average or mean is determined:

$$\hat{\gamma}(t) = E[X_t(5)] \quad \text{Equation 14}$$

where $\hat{\gamma}$ represents an estimated SNR distance ratio. In response to determining the estimated SNR distance ratio is less than or equal a predetermined value that is less than one, the estimation block 78 determines the ghost position 54 is a valid ghost point. In response to determining estimated SNR distance ratio is greater than the predetermined value that is less than one, the ghost position 54 is a non-ghost point. In an embodiment, the predetermined value that is less than one is 0.98. Once the estimation block 78 determines several consecutive non-ghost points, the ghost vehicle tracking block 48 ceases to track the non-ghost vehicle.

Figure 3:
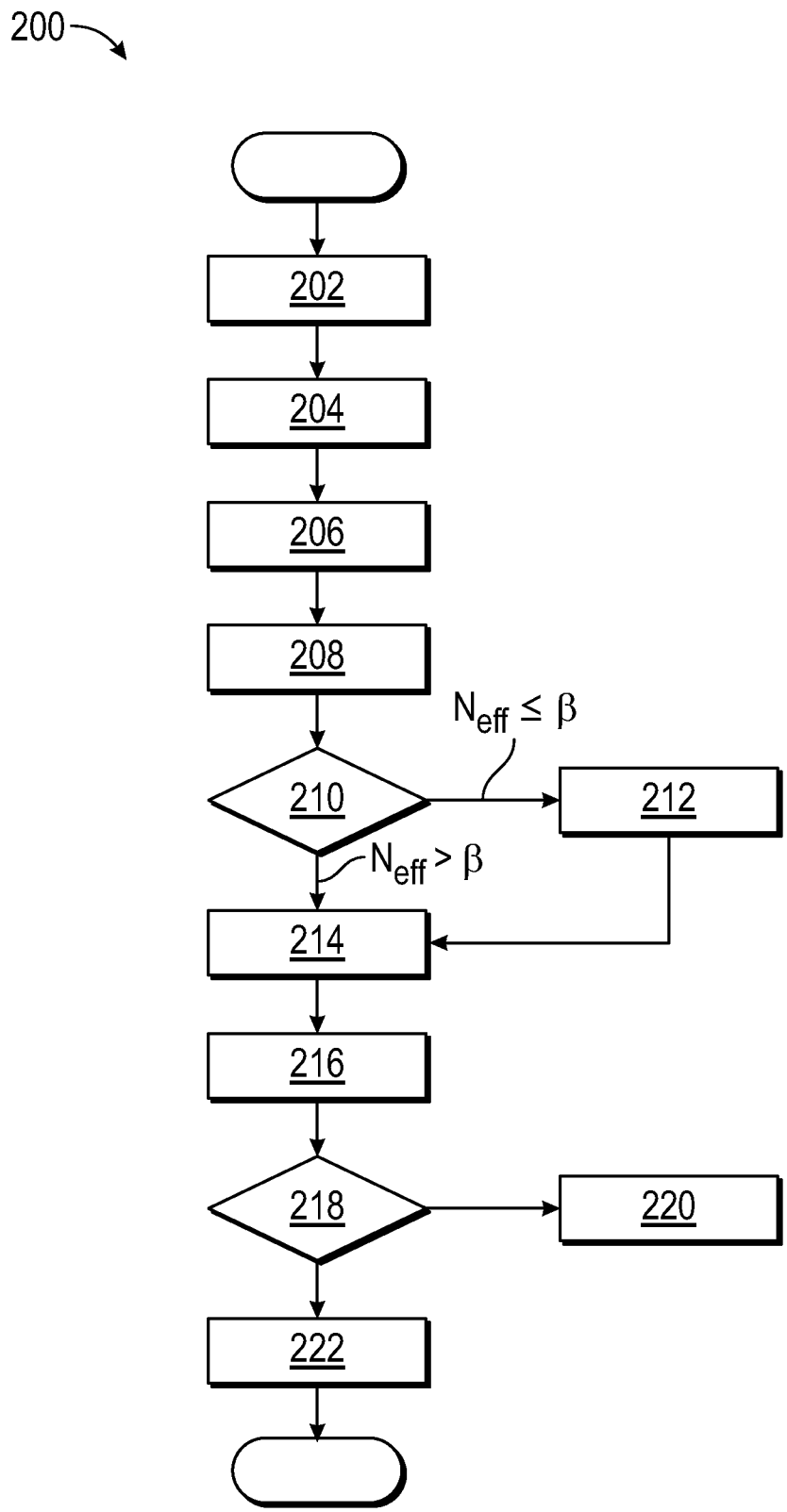
FIG. 3 is a process flow diagram illustrating a method for identifying and tracking ghost vehicles using the radar anti-spoofing system, according to an exemplary embodiment.

FIG. 3 is a process flow diagram illustrating a method 200 to detect and track ghost vehicles by the radar anti-spoofing system 32 shown in FIG. 1. Referring generally to FIGS. 1-3, the method 200 may begin at block 202. In block 202, the ghost vehicle detection block 46 determines the SNR distance ratio 52 for the input detection points 50 based on the plurality of radar sensors 20, where the value of the SNR distance ratio 52 is indicative of an object being a ghost vehicle. As discussed above, the SNR distance ratio 52 is determined based on Equation 2. The method 200 may then proceed to block 204.

In block 204, the sampling block 70 of the ghost vehicle tracking block 48 determines the importance sampling for each variable that is part of a state variable $X_t$ based on the input detection points 50 and the SNR distance ratio 52, and is expressed in Equation Sets 4-8. The method 200 may proceed to block 206.

In block 206, the weighting block 72 weights the importance sampling for each variable that is part of the state variable $X_t$. The weighting block 72 then normalizes the weights at each time step t based on Equation 11. The method 200 may then proceed to block 208.

In block 208, the check degradation block 74 determines the effective particle number $N_{eff}$ that indicates a degree of particle degradation for the importance sampling for each variable that is part of the state variable $X_t$. The method 200 may then proceed to decision block 210.

In decision block 210, in response to determining the effective particle number $N_{eff}$ is equal to or less than the predetermined threshold the method 200 may then proceed to block 212. In block 212, the resampling block 76 re-executes a resampling operation to improve particle distribution. The method 200 may then proceed to block 214. Returning to decision block 210, in response to determining the effective particle number $N_{eff}$ is greater than the predetermined threshold $\beta$, then the method 200 may proceed to block 214.

In block 214, the estimation block 78 estimates the ghost position 54 for the ghost vehicle based on the state variable $X_t$ using Equation 13 as described above. The method 200 may then proceed to block 216.

In block 216, the check constraint ratio block 80 estimates the SNR distance ratio 52 based on the state variable $X_t$. by Equation 14 to determine an estimated SNR distance ratio. The method 200 may then proceed to decision block 218.

In decision block 218, the check constraint ratio block 80 compares the estimated SNR distance ratio with a predetermined value less than one. In response to determining the estimated SNR distance ratio is less than or equal to the predetermined value that is less than one, the method proceeds to block 220, and the estimation block 78 determines the ghost position 54 is a valid ghost point. In response to determining estimated SNR distance ratio is greater than the predetermined value that is less than one, the method proceeds to block 222, and the estimation block 78 determines the ghost position 54 is a non-ghost point. The method 200 may then terminate or return to block 202.

Referring generally to the figures, the disclosed radar anti-spoofing system provides various technical effects and benefits for identifying and tracking ghost vehicles. Specifically, the radar anti-spoofing system provides an effective approach for identifying and tracking ghost vehicles for a nonlinear system and for non-Gaussian noise environments, thereby enabling the autonomous vehicle to only react to sensor data collected from real vehicles. The radar anti-spoofing system identifies an object as a ghost vehicle based on a value of the SNR distance ratio. Furthermore, the disclosed radar anti-spoofing system also includes a particle filtering technique to effectively track ghost vehicles as well.

Figure 4:
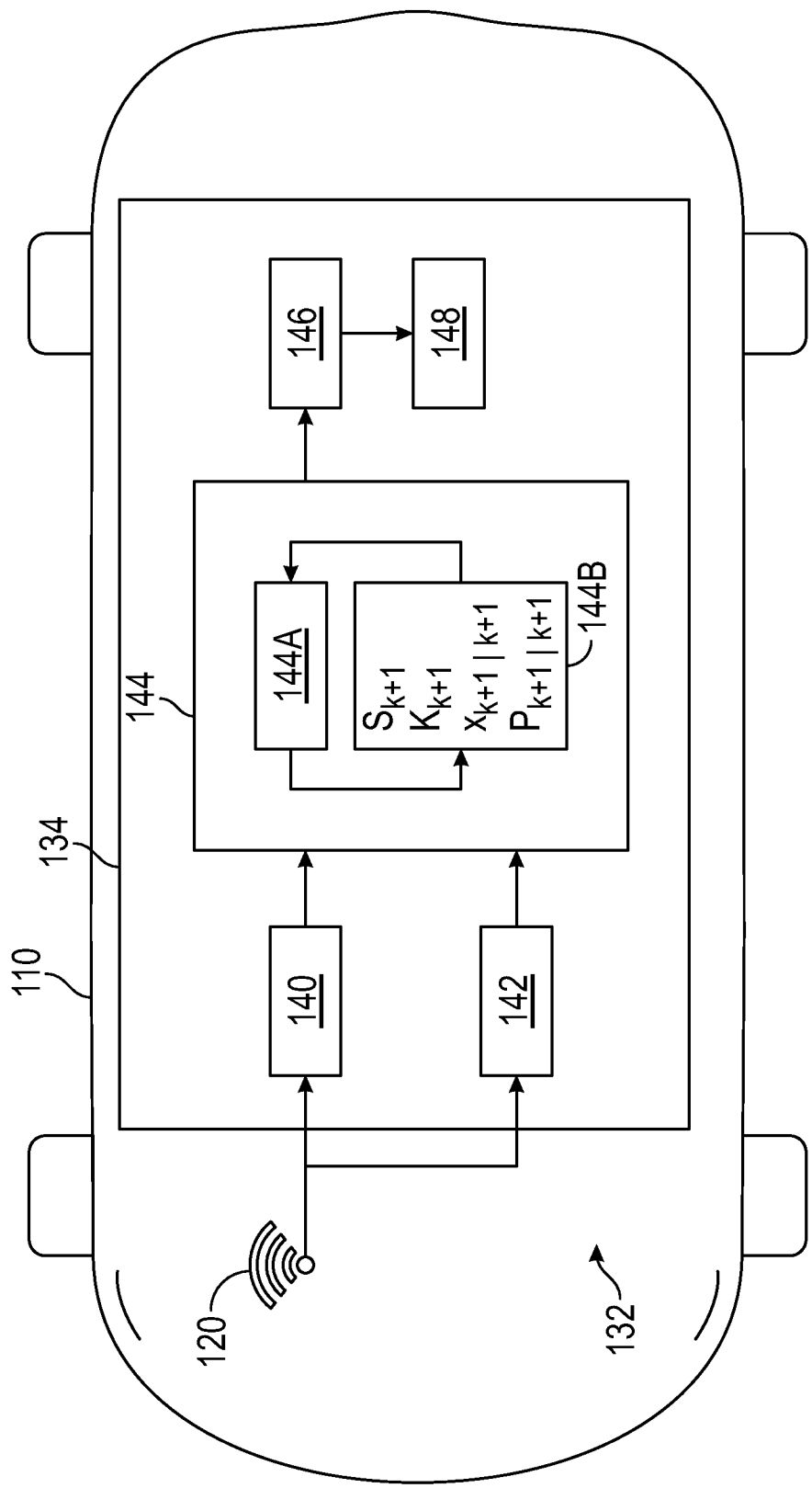
FIG. 4 is a schematic diagram of another embodiment of a radar anti-spoofing system, according to an exemplary embodiment.

FIG. 4 is an illustration of another embodiment of a radar anti-spoofing system 132 for an autonomous vehicle 110. In the embodiment as shown in FIG. 4, the radar anti-spoofing system 132 includes one or more controllers 134 in communication with a plurality of radar sensors 120. The one or more controllers 134 include a SNR deviation module 140, a Doppler frequency deviation module 142, a Kalman filter 144, a spoofing detection measure module 146, and a spoofed vehicle module 148. In the embodiment as shown in FIG. 4, the disclosed radar anti-spoofing system 132 identifies ghost vehicles based on Kalman filtering, which is described in greater detail below.

The SNR deviation module 140 determines a SNR deviation factor for an object in the environment based on input detection points 150 from the plurality of radar sensors 120. Specifically, the SNR deviation factor is calculated by determining a difference between an expected SNR and a measured SNR for the object. In an embodiment, the SNR deviation factor is determined based on Equation 15:

$$Dev_{SNR} = 1.0 + |SNR_{Expected} - SNR_{Measured}| \quad \text{Equation 15}$$

where $Dev_{SNR}$ is the SNR deviation factor, $SNR_{Expected}$ is the expected SNR, and $SNR_{Measured}$ is the measured SNR. It is to be appreciated that the additional constant of 1.0 in Equation 15 is applied to maintain the original measurement noise covariance when the expected SNR and the measured SNR are equal in value, which is what occurs when the object is a real vehicle.

The Doppler frequency deviation module 142 determines a Doppler deviation factor for THE object in the environment based on input detection points 150 from the plurality of radar sensors 120. Specifically, the Doppler deviation factor is calculated by determining a difference between an expected Doppler frequency and a measured Doppler frequency for the object. In an embodiment, the Doppler deviation factor is determined based on Equation 16:

$$Dev_{Doppler} = 1.0 + |Doppler_{Expected} - Doppler_{Measured}| \quad \text{Equation 16}$$

where $Dev_{Doppler}$ is the Doppler deviation factor, $Doppler_{Expected}$ is the expected Doppler frequency, and $Doppler_{Measured}$ is the measured Doppler frequency.

Both the SNR deviation factor and the Doppler deviation factor are sent to the Kalman filter 144. The Kalman filter 144 includes a prediction module 144A and an update module 144B, where the prediction module 144A receives initial values and predicts a state before sending the state to the update module 144B. The update module 144B determines four variables, a modified innovation covariance matrix $S_{k+1}$, a Kalman gain $K_{k+1}$, a state estimate $x_{k+1|k+1}$, and an updated state covariance matrix $P_{k+1|k+1}$. When employing a standard Kalman filter, the innovation covariance matrix $S_{k+1}$ is normally expressed in Equation 17 as:

$$S_{k+1} = H_{k+1} P_{k+1|k} H_{k+1}^T + R_{k+1} \quad \text{Equation 17}$$

where $H_{k+1}$ is an observation matrix, $R_{k+1}$ is a measurement noise covariance matrix, and k represents a time step. For the present disclosure, the innovation covariance matrix $S_{k+1}$ is modified by multiplying the measurement noise covariance matrix $R_{k+1}$ by the SNR deviation factor, and is expressed in Equation 18 as:

$$S_{k+1} = H_{k+1} P_{k+1|k} H_{k+1}^T + Dev_{SNR} \cdot R_{k+1} \quad \text{Equation 18}$$

It is to be appreciated that when the plurality of radar sensors 120 are spoofed, the value of the SNR deviation factor increases over time. As a result, the value of the measurement noise covariance matrix $R_{k+1}$ increases over time and the Kalman gain $K_{k+1}$ decreases over time. Accordingly, the input detection points 150 from the plurality of radar sensors 120 that are generated by ghost vehicles have a lower impact upon the state updates over time. Furthermore, because the Kalman gain $K_{k+1}$ decreases over time, a value of the updated state covariance matrix $P_{k+1|k+1}$ is reduced less over time as well.

In an embodiment, the innovation covariance matrix $S_{k+1}$ is further modified by multiplying the measurement noise covariance matrix $R_{k+1}$ by the SNR deviation factor and the Doppler deviation factor, and is expressed in Equation 19 as:

$$S_{k+1} = H_{k+1} P_{k+1|k} H_{k+1}^T + Dev_{Doppler} Dev_{SNR} R_{k+1} \quad \text{Equation 19}$$

The updated state covariance matrix, $P_{k+1|k+1}$ determined by the Kalman filter 144 is sent to the spoofing detection measure module 146. The spoofing detection measure module 146 determines a spoofing detection measure that quantifies a relationship between the updated state covariance matrix $P_{k+1|k+1}$ determined by the Kalman filter 144 and a detected distance d measured between the autonomous vehicle 110 and the object. In an embodiment, the spoofing detection measure is determined based on Equation 20, which is:

$$\text{Spoofing Detection Measure} = \frac{\sqrt[n]{\det(P)}}{d} = \frac{\|P\|}{d} \quad \text{Equation 20}$$

where P represents the updated state covariance matrix, d represents a detected distance of the object, and n represents a dimension of the state vector. It is to be appreciated that for a real vehicle, a magnitude of the updated state covariance matrix $P_{k+1|k+1}$ determined by the Kalman filter 144 is inversely related to the detected distance d of the object. Accordingly, real vehicles will generate a near-constant value for the spoofing detection measure over time. However, ghost vehicles generate relatively large fluctuations in the spoofing detection measure. Therefore, as explained in detail below, the spoofed vehicle module 148 monitors a value of the spoofing detection measure over time to determine if the object is a real vehicle or a ghost vehicle.

Continuing to refer to FIG. 4, the spoofed vehicle module 148 determines a spoofing detection measurement ratio based on a standard deviation of the spoofing detection measure determined over a defined time window divided by a mean value of the spoofing detection measure determined over the defined time window. In an embodiment, the spoofed vehicle module 148 compares the spoofing detection measure ratio with a threshold value to determine if the object is a ghost vehicle. Specifically, as expressed in Equation 21 below, if the spoofing detection measure ratio is greater than the threshold value th, then the object is a ghost vehicle. The spoofing detection measure ratio is determined in Equation 21 as:

$$\frac{\text{std\_dev}(SDM_m^{m+d})}{\text{mean}(SDM_m^{m+d})} > th \quad \text{Equation 21}$$

where $SDM_m^{m+d}$ is the SDM vector between time m and m+d.

It is to be appreciated that a value of the threshold value th is between zero and one and is determined based on a relationship between a probability of detection and a purity of detection. The probability of detection signifies what fraction of the real detections are correctly classified as real, and the purity indicates a ratio of real detections classified as real to all detections classified as real. In general, the rates between the probability of detection and a purity of the detection are a trade-off, where a lower value for the threshold value th results in a higher purity of detection, and a higher value for the threshold value th results in a higher probability of detection.

Figure 5:
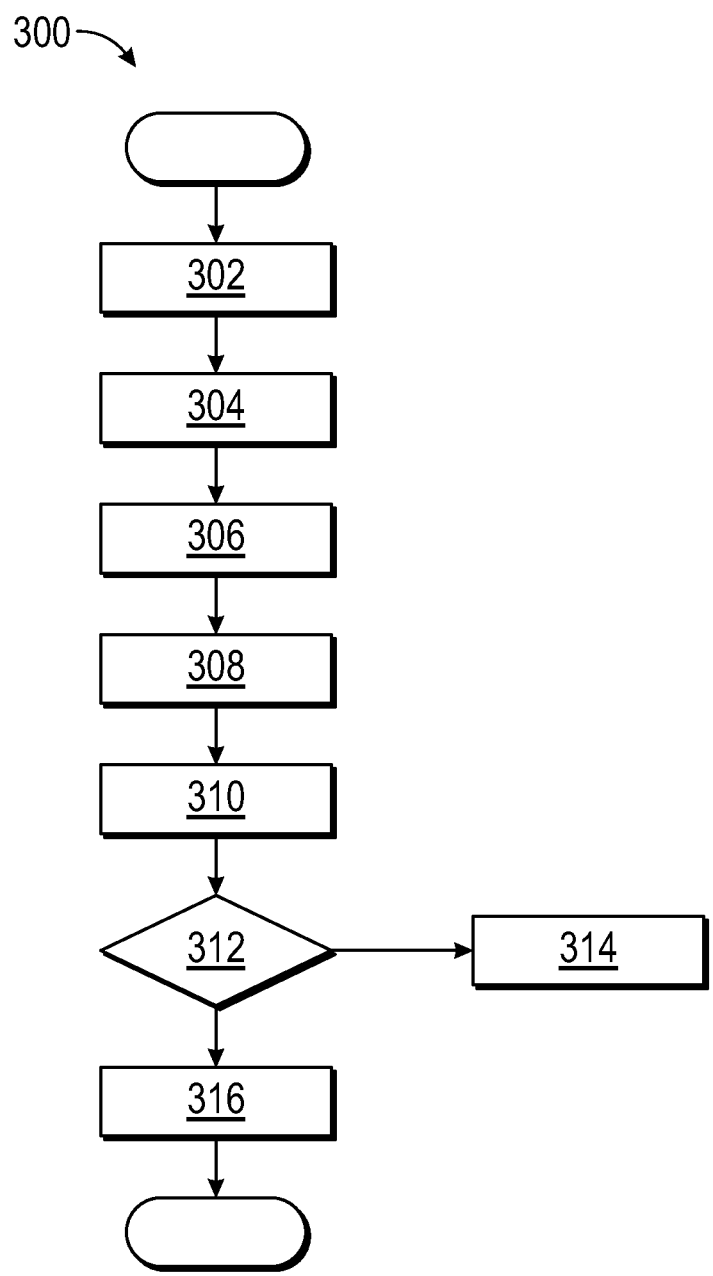
FIG. 5 is a process flow diagram illustrating a method for identifying a ghost vehicle based on the radar anti-spoofing system shown in FIG. 4, according to an exemplary embodiment.

FIG. 5 is a process flow diagram illustrating a method 300 for identifying ghost vehicles by the disclosed radar anti-spoofing system 132. Referring to FIGS. 4 and 5, the method 300 may begin at block 302. In block 302, the SNR deviation module 140 determines the SNR deviation factor for an object in the environment based on input detection points 150 from the plurality of radar sensors 120. Specifically, the SNR deviation factor is calculated by determining a difference between an expected SNR and a measured SNR for the object, which is expressed in Equation 15 above. The method 300 may then proceed to block 304.

In block 304, the Doppler frequency deviation module 142 determines the Doppler deviation factor for the object in the environment based on input detection points 150 from the plurality of radar sensors 120. Specifically, the Doppler deviation factor is calculated by determining a difference between the expected Doppler frequency and the measured Doppler frequency for the object, which is expressed in Equation 16 above. It is to be appreciated that block 304 is optional and may be omitted in some embodiments. The method 300 may then proceed to block 306.

In block 306, the innovation covariance matrix $S_{k+1}$ of the update module 144B of the Kalman filter 144 is modified by combining the measurement noise covariance matrix $R_{k+1}$ with the SNR deviation factor. In an embodiment, the Doppler deviation factor is also combined with the innovation covariance matrix $S_{k+1}$ as well. The method 300 may then proceed to block 308.

In block 308, the spoofed vehicle module 148 determines a spoofing detection measure that quantifies a relationship between the updated state covariance matrix $P_{k+1|k+1}$ determined by the Kalman filter 144 and the detected distance d measured between the autonomous vehicle 110 and the object. As mentioned above, the value of the spoofing detection measure changes with respect to time when the object is a ghost vehicle. The method 300 may then proceed to block 310.

In block 310, the spoofed vehicle module 148 determines the spoofing detection measurement ratio based on a standard deviation of the spoofing detection measure determined over a defined time window divided by a mean value of the spoofing detection measure determined over the defined time window, which is expressed in Equation 20 above. The method 300 may then proceed to decision block 312.

In decision block 312, the spoofed vehicle module 148 compares the spoofing detection measure ratio with the threshold value. In response to determining the spoofing detection measure ratio is greater than the threshold value th, the method 300 may proceed to block 314. In block 314, the spoofed vehicle module 148 determines the object is a ghost vehicle. In response to determining the spoofing detection measure ratio is less than or equal to the threshold value th, the method 300 may proceed to block 316. In block 316, the spoofed vehicle module 148 determines the object is a real vehicle. The method 300 may then terminate or return to block 302.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A radar anti-spoofing system for an autonomous vehicle, the radar anti-spoofing system comprising:
    a plurality of radar sensors that generate a plurality of input detection points representing radio frequency (RF) signals reflected from objects; and
    one or more controllers in electronic communication with the plurality of radar sensors, wherein the one or more controllers execute instructions to:
        determine a signal to noise ratio (SNR) distance ratio for the plurality of input detection points generated by the plurality of radar sensors, wherein a value of the SNR distance ratio is indicative of an object being a ghost vehicle;
        determine importance sampling for each variable that is part of a state variable based on the plurality of input detection points and the SNR distance ratio;
        weight the importance sampling for each variable that is part of the state variable;
        determine an effective particle number indicating a degree of particle degradation for the importance sampling for each variable that is part of the state variable; and
        in response to determining the effective particle number is equal to or less than a predetermined threshold, estimate a ghost position for the ghost vehicle based on the state variable.

2. The radar anti-spoofing system of claim 1, wherein the SNR distance ratio represents a difference in an SNR constraint variable for the object over time, wherein the SNR constraint variable represents a physical constraint between a measured SNR and a distance of the object.

3. The radar anti-spoofing system of claim 1, wherein the SNR distance ratio is determined by:

$$\gamma = \frac{C(t+1)}{C(t)} = \left[\frac{d_M(t+1)d_T(t)}{d_M(t)d_T(t+1)}\right]^4$$

wherein t and t+1 represent sequential time steps, $\gamma$ is an SNR constraint variable, $d_T$ represents a true distance, and $d_M$ represents a measured distance.

4. The radar anti-spoofing system of claim 1, wherein the state variable is expressed as:

$$X_t=[x(t),y(t),v_x(t),v_y(t),\gamma(t)]^T$$

wherein $X_t$ is the state variable, x(t), y(t) represent x and y positions, $v_x(t)$, $v_y(t)$ represent x and y velocity coordinates, and $\gamma(t)$ is the SNR distance ratio.

5. The radar anti-spoofing system of claim 1, wherein weighting the importance sampling for each variable that is part of the state variable is done by determining:

$$w_t^i = w_{t-1}^i * p(Z_t|X_t^i, Z_{t-1})$$

$$p(Z_t \mid X_t^i, Z_{t-1}) \propto \prod_{j=1}^{5} \left(1 + e^{-|X_t^i(j) - Z_{t-1}(j)|/2\sigma_j}\right)$$

wherein $w_t^i$ represents weights of sampled points at time step t, $p(Z_t|X_t^i,Z_{t-1})$ is a posterior distribution, $\{X_t^i\}_{i=1}^N$ is a set of sampled points, and $\sigma_j$ represents a variance that depends upon a dynamic range of a corresponding component.

6. The radar anti-spoofing system of claim 1, wherein the effective particle number is determined by:

$$N_{\text{eff}} = \frac{1}{\sum_{i=1}^{N_s} (w_t^i)^2}$$

wherein $N_{\text{eff}}$ is the effective particle number, $N_s$ is a number of total particle points, and $w_t^i$ represents the weights of the sampled points at time step t.

7. The radar anti-spoofing system of claim 6, wherein the predetermined threshold is equal to half the number of total particle points.

8. The radar anti-spoofing system of claim 1, wherein the one or more controllers executes instructions to:
in response to determining the effective particle number is equal to or less than the predetermined threshold, re-execute a resampling operation to improve particle distribution.

9. The radar anti-spoofing system of claim 1, wherein the one or more controllers executes instructions to:
estimate the SNR distance ratio based on the state variable to determine an estimated SNR distance ratio.

10. The radar anti-spoofing system of claim 9, wherein the one or more controllers executes instructions to:
compare the estimated SNR distance ratio with a predetermined value less than one; and
in response to determining the estimated SNR distance ratio is less than or equal to the predetermined value that is less than one, determine the ghost position is a valid ghost point.

11. The radar anti-spoofing system of claim 9, wherein the one or more controllers executes instructions to:
in response to determining estimated SNR distance ratio is greater than the predetermined value that is less than one, determine the ghost position is a non-ghost point.

12. A method for detecting and tracking ghost vehicles by a radar anti-spoofing system, the method comprising:
determining, by one or more controllers, a SNR distance ratio for input detection points generated by a plurality of radar sensors, wherein a value of the SNR distance ratio is indicative of an object being a ghost vehicle;
determining, by the one or more controllers, importance sampling for each variable that is part of a state variable based on the plurality of input detection points and the SNR distance ratio;
weighting the importance sampling for each variable that is part of the state variable;
determining an effective particle number indicating a degree of particle degradation for the importance sampling for each variable that is part of the state variable; and
in response to determining the effective particle number is equal to or less than a predetermined threshold, estimating a ghost position for the ghost vehicle based on the state variable.

13. The method of claim 12, further comprising:
in response to determining the effective particle number is equal to or less than the predetermined threshold, re-executing a resampling operation to improve particle distribution.

14. The method of claim 12, further comprising:
estimating the SNR distance ratio based on the state variable to determine an estimated SNR distance ratio.

15. The method of claim 14, further comprising:
comparing the estimated SNR distance ratio with a predetermined value less than one; and
in response to determining the estimated SNR distance ratio is less than or equal to the predetermined value that is less than one, determining the ghost position is a valid ghost point.

16. The method of claim 14, further comprising:
in response to determining estimated SNR distance ratio is greater than the predetermined value that is less than one, determining the ghost position is a non-ghost point.

17. A radar anti-spoofing system for an autonomous vehicle, the radar anti-spoofing system comprising:
a plurality of radar sensors that generate a plurality of input detection points representing RF signals reflected from objects; and
one or more controllers in electronic communication with the plurality of radar sensors, wherein the one or more controllers execute instructions to:
determine an SNR deviation factor for an object based on the plurality of input detection points from the plurality of radar sensors;
modify an innovation covariance matrix of a Kalman filter by combining a measurement noise covariance matrix with an SNR deviation factor; and
determine a spoofing detection measure that quantifies a relationship between an updated state covariance matrix determined by the Kalman filter and a detected distance measured between the autonomous vehicle and the object, wherein a value of the spoofing detection measure changes with respect to time when the object is a ghost vehicle.

18. The radar anti-spoofing system of claim 17, wherein the one or more controllers execute instructions to:
determine a spoofing detection measurement ratio based on a standard deviation of the spoofing detection measure determined over a defined time window divided by a mean value of the spoofing detection measure determined over the defined time window.

19. The radar anti-spoofing system of claim 18, wherein the one or more controllers execute instructions to:
compare the spoofing detection measure ratio with a threshold value;

in response to determining the spoofing detection measure ratio is greater than the threshold value, determines the object is a ghost vehicle; and in response to determining the spoofing detection measure ratio is less than or equal to the threshold value, determine the object is a real vehicle.

20. The radar anti-spoofing system of claim 17, wherein the one or more controllers execute instructions to:

calculate a Doppler deviation factor for the object by determining a difference between an expected Doppler frequency and a measured Doppler frequency for the object.

\* \* \* \* \*